July 28, 1931.  C. W. DEFFENBAUGH  1,816,364
CONNECTING MEANS FOR ECCENTRIC ARMS
Filed June 18, 1928
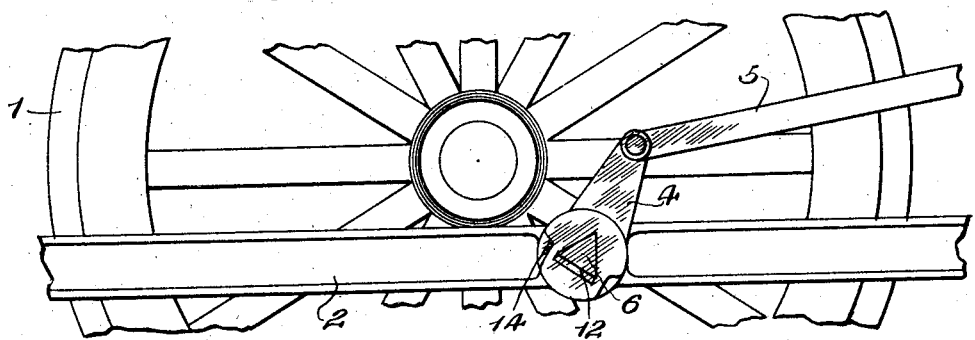
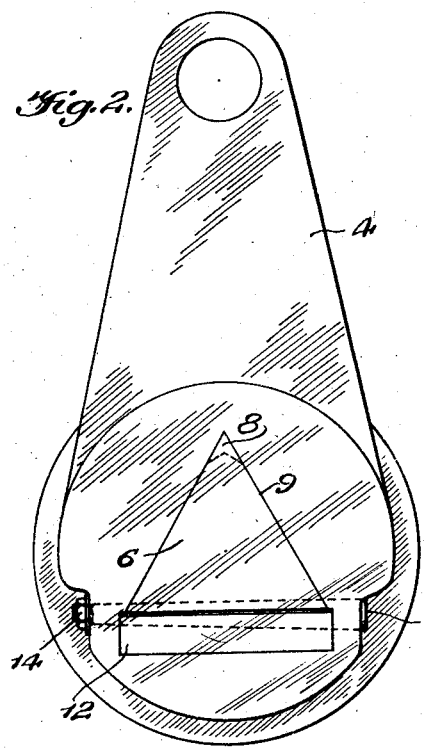
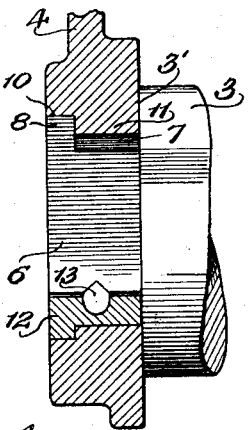
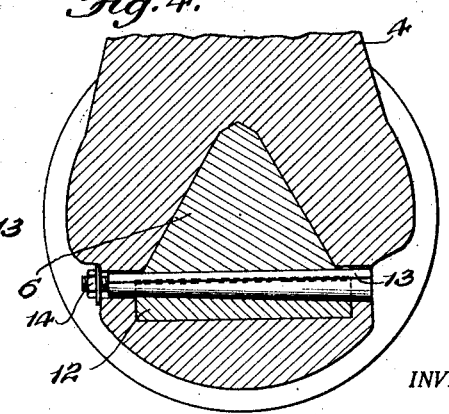
INVENTOR.
Charles W. Deffenbaugh
BY
Eccleston & Eccleston,
ATTORNEYS Patented July 28, 1931

1,816,364

UNITED STATES PATENT OFFICE

CHARLES W. DEFFENBAUGH, OF CUMBERLAND, MARYLAND

CONNECTING MEANS FOR ECCENTRIC ARMS

Application filed June 18, 1928. Serial No. 286,322.

This invention relates to a novel means for connecting the eccentric arm of a locomotive to the usual driving rod, but it will be obvious, of course, that the invention is not so limited in scope as it is also useful in connecting a crank arm of any type to a shaft with which the crank arm is to be associated.

An object of the invention resides in the provision of an attaching means for crank arms which may be readily attached and removed, and yet which is strong and durable in operation and so designed as to eliminate any possibility of accidental loosening of the arm from its shaft or pin.

Other objects and advantages of the invention will be apparent from the following description when taken in connection with the accompany drawing; in which Figure 1 is a fragmentary side elevation of one of the driving wheels of a locomotive, the driving rod, and the novel attaching means for the eccentric arm.

Figure 2 is an enlarged front elevational view of the crank arm and its attaching means.

Figure 3 is a fragmentary sectional view through the crank arm and the pin to which it is attached; and Figure 4 is a sectional view taken at right angles to that shown in Figure 3.

Referring to the drawing in greater detail the numeral 1 designates one of the drive wheels of a locomotive and provided with the usual drive rod 2. Mounted or formed on the drive rod 2 is a pin or shaft 3 to which is secured a crank arm 4. Pivoted to the end of the arm 4 is a rod 5 which in turn is connected with the slide valve of the locomotive for operating said valve synchronously with the operation of the driving wheels, etc. This construction is all of conventional form and I will now describe the novel and improved means by which the crank arm 4 is fixed to its pin 3.

The end of the pin 3 is reduced so as to provide a shoulder 3' against which the boss of the crank arm is seated, and the reduced portion 6 of the pin is of triangular shape as indicated in Figures 1, 2 and 4. This triangular reduced portion on the pin is provided with an undercut or rebated portion 7 so as to provide a projection or shoulder 8 at the front face thereof. Likewise, the crank arm 4 is provided with a triangular cut-out portion 9 of the same shape as the triangular portion of the pin but of somewhat greater dimensions. The boss of the crank arm is also provided with a cut-out portion 10 which is adapted to receive the projection 8 on the reduced end of the pin, and which also serves to provide a depending flange or shoulder 11 on the boss of the crank arm.

Due to the increased size of the opening in the crank arm it will be apparent that the arm, when properly positioned, may be moved axially of pin 3 so as to pass the projection 11 over the projection 8 on the reduced portion of the pin 3. If the crank arm is now lowered it will assume the position shown in Figure 3 in which the projection 11 is seated behind the projection 8.

In order to lock the crank arm in the position shown, a tapered wedge block 12 is positioned in the lower part of the cut-out portion of the crank arm, and a tapered key 13 is then passed transversely below the triangular portion 6 and between it and the wedge block 12, thus drawing the crank arm down and locking it in position behind the projection 8 on the pin 3. This key 13 may be driven into place and may be locked in position by means of a nut 14 threaded onto the end of the pin as indicated in Figures 2 and 4. It is to be noted also that the parts are so proportioned as to provide a slight clearance between the ends of key 13 and the adjacent part of the crank arm 4, thereby eliminating any possibility of wear between these parts.

By means of this simple construction it will be apparent that a strong and durable means is provided for securing the crank arm to the pin 3; that the crank arm is so locked in place as to practically eliminate any possibility of its accidental release; that the parts as designed avoid any wear on the locking key with a consequent liability of loosening the connection; and that release of the crank arm is permitted by the mere removal of the nut 14.

The device as disclosed herein may be changed as to various minor details of construction without departing from the essence of the invention, and all such minor changes are intended to be included within the scope of the appended claims.

Having fully described my invention what I claim as new and desire to secure by Letters Patent is:

1. In a device of the class described, a pin having a substantially triangular end portion, a shoulder formed on said end portion, a crank arm provided with an opening and fitted on the triangular portion of the pin but providing a space between one of the sides of the triangular portion and the opposed wall of the opening in the crank arm, a wedge block positioned in said space, and a tapered key substantially paralleling and cooperating with said block and said pin to lock said arm in position behind said shoulder.

2. In a device of the class described, a pin having a substantially triangular end portion, a shoulder formed on said end portion, a crank arm provided with an opening and fitted on the triangular portion of the pin but providing a space between one of the sides of the triangular portion and the opposed wall of the opening in the crank arm, a wedge block positioned in said space, a tapered key substantially paralleling and cooperating with said block and said pin to lock said arm in position behind said shoulder, and threaded means for securing said key in place.

3. In a device of the class described, a pin having a substantially triangular end portion, a V-shaped shoulder formed on the extreme end of said pin, a crank arm positioned on said pin and provided with a substantially triangular opening of slightly greater dimensions than the end of the pin, a wedge member disposed in the space between the pin and a wall of the opening in said crank arm and extending transversely of the pin, and a tapered key arranged longitudinally of said wedge member and cooperating therewith to lock said crank arm behind said shoulder.

CHARLES W. DEFFENBAUGH.